(12) United States Patent
Martin, II et al.

(10) Patent No.: US 10,790,579 B2
(45) Date of Patent: Sep. 29, 2020

(54) ADJUSTABLE ANTENNA SYSTEM FOR UNMANNED AERIAL VEHICLE

(71) Applicant: AT&T Intellectual Property I, L.P., Atlanta, GA (US)

(72) Inventors: Carl Lindsey Martin, II, Round Rock, TX (US); Haywood S. Peitzer, Randolph, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 184 days.

(21) Appl. No.: 15/988,864

(22) Filed: May 24, 2018

(65) Prior Publication Data

US 2019/0363429 A1    Nov. 28, 2019

(51) Int. Cl.
| | |
|---|---|
| *H01Q 1/28* | (2006.01) |
| *H01Q 19/12* | (2006.01) |
| *B64C 39/02* | (2006.01) |
| *H04B 7/185* | (2006.01) |

(52) U.S. Cl.
CPC ............ *H01Q 1/28* (2013.01); *H01Q 19/12* (2013.01); *B64C 39/024* (2013.01); *H04B 7/18506* (2013.01)

(58) Field of Classification Search
CPC ........ H01Q 1/28; H01Q 19/12; B64C 39/024; B64C 2201/122; H04B 7/18506
See application file for complete search history.

(56) References Cited

U.S. PATENT DOCUMENTS

| | | | |
|---|---|---|---|
| 9,866,313 B1 * | 1/2018 | Murphy | H04B 7/18504 |
| 2017/0150373 A1 * | 5/2017 | Brennan | H04W 16/28 |
| 2017/0295069 A1 * | 10/2017 | Sweet, III | B64C 39/024 |

* cited by examiner

*Primary Examiner* — Dameon E Levi
*Assistant Examiner* — David E Lotter
(74) *Attorney, Agent, or Firm* — Haynes and Boone, LLP (57) ABSTRACT

An antenna system for an unmanned aerial vehicle (UAV) includes one or more antennas, a reflector, and a control system. The control system is configured to determine a density of antenna towers near the UAV, determine a position for an active antenna of the one or more antennas based on the density, and adjust the active antenna to the determined position. In some embodiments, the antenna system further includes one or more switches, each of the one or more antennas is a different distance from the reflector, and the switches are used to adjust the active antenna to the determined position by selecting a one of the one or more antennas closest to the determined position as the active antenna. In some embodiments, the antenna system further includes an actuator and the active antenna is moved to the determined position using the actuator.

20 Claims, 5 Drawing Sheets

ADJUSTABLE ANTENNA SYSTEM FOR UNMANNED AERIAL VEHICLE

TECHNICAL FIELD

The present disclosure relates generally to communication systems for unmanned aerial vehicles and more specifically to an antenna system for unmanned aerial vehicles.

BACKGROUND

Unmanned aerial vehicles (UAVs), which are often colloquially referred to as "drones," are becoming increasingly popular among consumers, businesses, and government. For example, large numbers of individuals and organizations are using UAVs mounted with video cameras to obtain high angle or downward facing video segments to supplement more conventional photography for such applications as video blogging, event photography, event monitoring, and/or the like. The typical UAV is controlled remotely by an operator using a hand-held controller that allows the operator to control altitude, orientation, direction, and velocity of the UAV as well as the photo, video, and/or other sensory functions of the UAV. During operation, the hand-held controller (and thus the operator) typically remains in line-of-sight or near line-of-sight with the UAV to allow the operator to monitor the flight of the UAV and to maintain bidirectional communications between an antenna on the hand-held controller and an antenna on the UAV, which typically have to remain within line-of-sight or near line-of-sight with each other. This typically limits the range of the UAV and may also place limitations on the bandwidth of the communications that may limit the amount and/or quality of photo or video data being transmitted from the UAV to the hand-held controller.

Much of North America and other parts of the world are serviced by sophisticated wireless communications networks that are capable of supporting high bandwidth bidirectional communications, such as 1X, 3G, 4G, 4G LTE, 5G networks, and/or the like. These networks are typically used to support mobile devices such as cell phones, smart phones, tablets, lap tops, and/or the like and not only provide support for phone calls, text messages, and email, but also provide support for internet communication, video streaming, and/or other high bandwidth applications.

Accordingly, it would be advantageous to adapt the capabilities of these networks to support both line-of-sight and non-line-of-sight communication with and control of UAVs.

SUMMARY

The embodiments of the invention are best summarized by the claims that follow the description.

Consistent with some embodiments, an antenna system for an unmanned aerial vehicle (UAV) includes one or more antennas, a reflector, and a control system. The control system is configured to determine a density of antenna towers near the UAV, determine a position for an active antenna of the one or more antennas based on the density, and adjust the active antenna to the determined position.

Consistent with some embodiments, a method performed by a control system of an antenna system for an unmanned aerial vehicle (UAV) includes determining a density of antenna towers near the UAV, determining a position for an active antenna of one or more antennas of the antenna system based on the density, and adjusting, by the control system, the active antenna to the determined position. The position is relative to a reflector of the antenna system.

Consistent with some embodiments, an unmanned aerial vehicle (UAV) includes a body, an antenna system mounted to the body for receiving commands for the UAV via a network and for transmitting data from the UAV via the network, and a control system. The antenna system has a reflector and one or more antennas. The control system is configured to determine a density of antenna towers near the UAV, determine a position for an active antenna of the one or more antennas based on the density, and adjust the active antenna to the determined position.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1A:
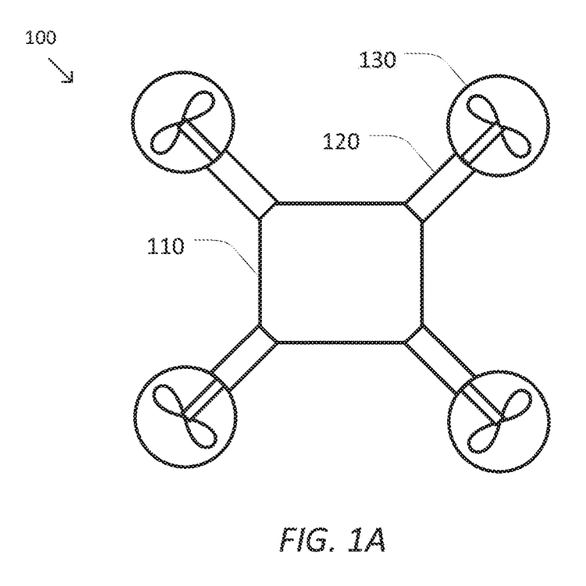
FIG. 1A is a simplified diagram of a top view of an unmanned aerial vehicle according to some embodiments.

FIG. 1A is a simplified diagram of a top view of an unmanned aerial vehicle (UAV) 100 according to some embodiments. As shown in FIG. 1A, UAV 100 includes a central body 110. Attached to each of the four corners of body 110 is a strut 120 coupling body 110 to a propeller 130. In some examples, steering and control of UAV 100 during flight is accomplished by independently controlling the rotation speed of each of the propellers 130, thus controlling the amount of lift provided by the respective propeller 130, which may be used to control at least a pitch, roll, and/or a bank of UAV 100, thus also controlling the direction of flight of UAV 100. And although, UAV 100 is representative of a four propeller UAV or quadcopter-style UAV, one of ordinary skill in the art would understand that other configurations of UAV 100 are possible, including UAVs with fewer than four or more than four propellers and/or with alternative forms of lift, propulsion, and/or other configurations, such as helicopter, plane, and/or other configurations, without being inconsistent with the embodiments disclosed herein.

Figure 1B:
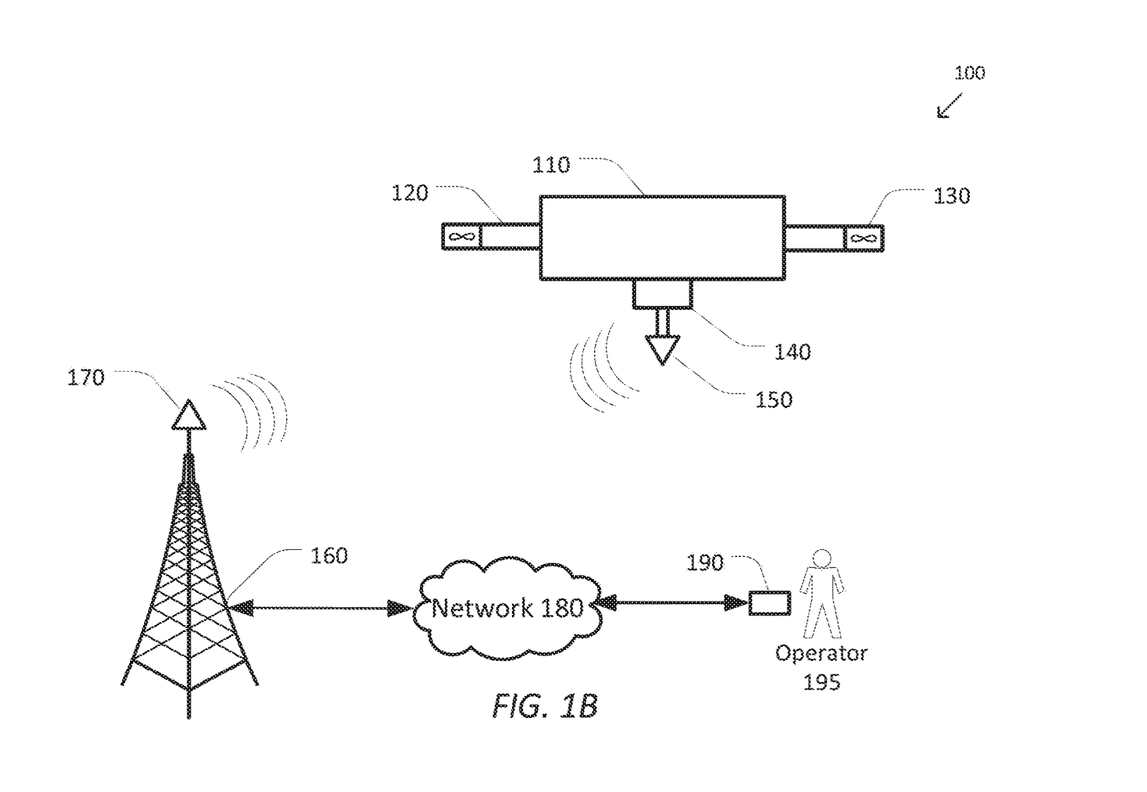
FIG. 1B is a simplified diagram of a side view of an unmanned aerial vehicle in communication with an antenna tower according to some embodiments.

FIG. 1B is a simplified diagram of a side view of unmanned aerial vehicle 100 in communication with an antenna tower 160 according to some embodiments. As shown in FIG. 1B, the underside of UAV 100 further includes an antenna mount 140 used to mount an antenna system 150 to UAV 100. In some examples, antenna mount 140 is designed to be self-leveling as is described in further detail in U.S. patent application Ser. No. 15/466,318, filed Mar. 22, 2017, which is incorporated by reference herein. Antenna system 150 includes one or more antennas that are used to emit and receive signals (e.g., radio frequency (RF) signals) to allow UAV 100 to receive commands from an operator using a controller and to send back telemetry data, images, video (e.g., 4K UL video), and/or the like to the operator and/or other destination.

FIG. 1B further shows antenna tower 160 with an antenna 170 mounted at the top of antenna tower 160. And although antenna 170 is shown at the top of antenna tower 160, one of ordinary skill in the art would understand that antenna 170 may be mounted at other locations on antenna tower 160 as is well understood in the art. Like the one or more antennas of antenna system 150, antenna 170 is used to emit and receive signals (e.g., RF signals) used to send commands to UAV 100 and to receive data from UAV 100. In some examples, antenna tower 160 and antenna 170 may be part of a cellular communication network including many other antenna towers (not shown) and antennas (not shown), such as a network capable of supporting communications via 1X, 3G, 4G, 4G LTE, 5G, and/or the like. In some examples, each of the one or more antennas of antenna system 150 may be a multiband antenna allowing the one or more antennas of antenna system 150 and UAV 100 to communicate with antennas for various network types. In some examples, each of the one or more antennas of antenna system 150 may be a multi-in multi-out (MIMO) antenna supporting at least two highly decorrelated antenna elements per communication band allowing for flexible use of antenna system 150 with each of the various network types it supports.

Antenna 170 may be coupled to a network 180. Network 180 may include one or more network switching devices, such as routers, switches, hubs, and/or bridges, which forward messages and/or other communications between antenna 170 and a controller 190 for UAV 100 being operated by an operator 195. In practice, network 180 may include portions of the cellular network to which antenna 170 belongs as well as may include portions of other networks such as one or more local area networks (LANs), such as Ethernet protocol LANs, or wide area networks (WANs), such as the Internet. In some examples, controller 190 may be a hand-held controller for UAV 100 that is adapted to communicate with UAV 100 using network 180 and antenna 170. In some examples, controller 190 may be a smart phone, tablet, lap top, and/or other computing device running one or more applications that are usable by operator 195 to communicate with UAV 100, control UAV 100, and/or receive telemetry, photos, videos, and/or other data from UAV 100. Because operator 195 is using controller 190 to communicate with and control UAV 100 using network 180 and antenna 170, operator 195 no longer needs to remain within line-of-sight with UAV 100 in order to communicate with and control UAV 100.

As discussed above and further emphasized here, FIG. 1B is merely an example which should not unduly limit the scope of the claims. One of ordinary skill in the art would recognize many variations, alternatives, and modifications. In some embodiments, UAV 100 may include other components. In some examples, a protective boot and/or other sleeve may be used in conjunction with antenna mount 140 to provide a weather proof seal between antenna system 150 and the interior of antenna mount 140 and/or UAV 100. In some examples, the weather proof seal may help protect UAV, antenna circuitry, and/or the like from rain, sleet, snow, ice, and/or other weather hazards. In some examples, antenna system 150 and/or antenna mount 140 may be surrounded by a radome or other protective cover to protect antenna system 150 from wind, rain, and/or other elements. In some examples, the radome may be non-conductive so as to minimize interference with the signals being transmitted or received by the one or more antennas of antenna system 150.

Figure 2:
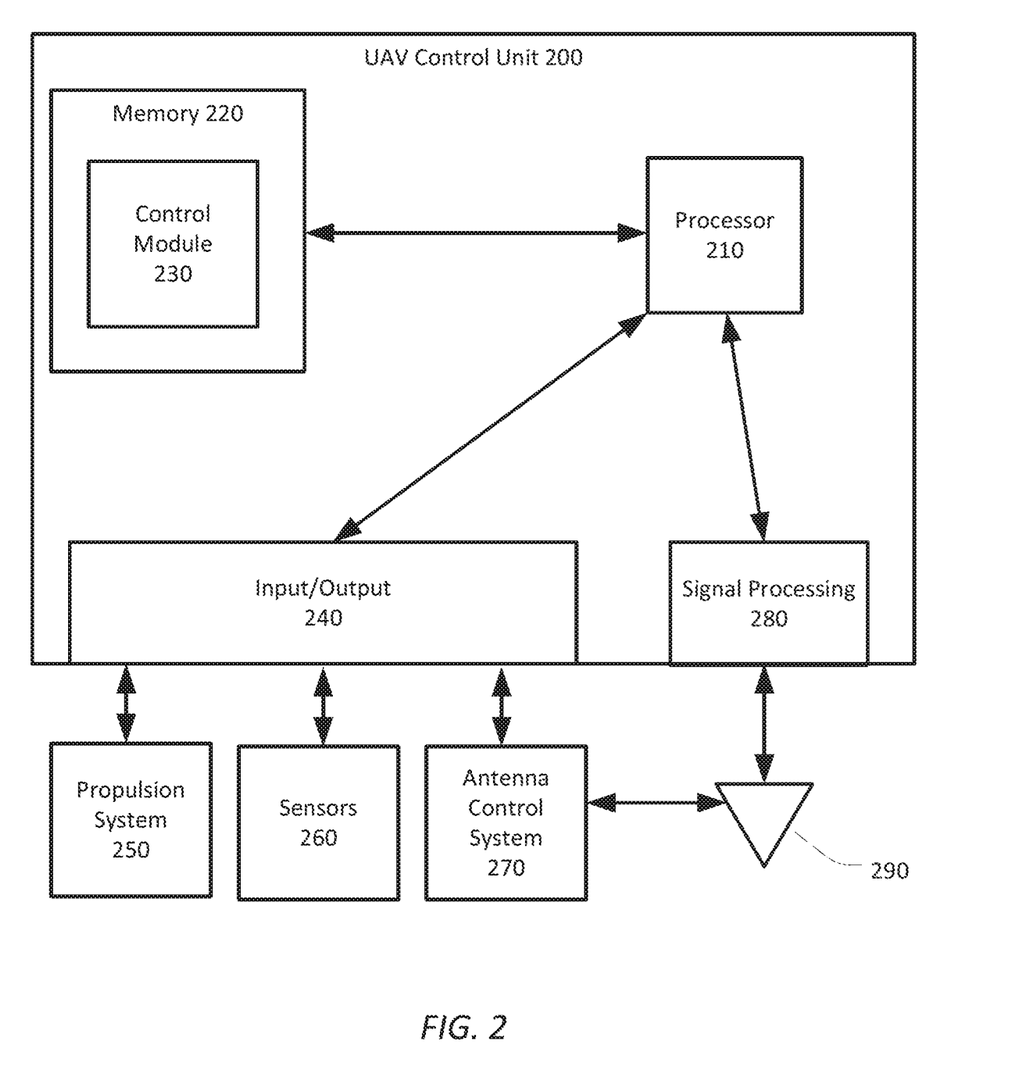
FIG. 2 is a simplified diagram of a control unit for an unmanned aerial vehicle according to some embodiments.

FIG. 2 is a simplified diagram of a control unit 200 for an unmanned aerial vehicle (UAV) according to some embodiments. According to some embodiments, control unit 200 may be suitable for use with UAV 100 and may, for example, be located somewhere on or within body 110. The organization of the systems, subsystems, and/or components of FIG. 2 should be considered representative only as other configurations of the systems, subsystems, and/or components are possible as would be understood by one of ordinary skill in the art. As shown in FIG. 2, control unit 200 includes a processor 210 coupled to memory 220. In some examples, processor 210 may control operation and/or execution of hardware and/or software on control unit 200 and, by extension through various inputs and output, other components in the UAV. Although only one processor 210 is shown, control unit 200 may include multiple processors, multi-core processors, microprocessors, digital signal processors (DSPs), graphics processing units (GPUs), application specific integrated circuits (ASICs), field programmable gate arrays (FPGAs), and/or the like. Memory 220 may include one or more types of machine readable media. Some common forms of machine readable media may include RAM, PROM, EPROM, FLASH-EPROM, any other memory chip or cartridge, and/or any other medium from which a processor or computer is adapted to read.

Memory 220 may be used to store an operating system (not shown) and/or one or more applications that are executed by processor 210. This includes at least control module 230. Control module 230 may include software and other data structures usable to operate control unit 200 and to control the UAV and the subsystems of the UAV as well as to provide data from the UAV to other devices.

Control unit 200 further includes an input/output system 240 and signal processing circuitry 280. Input/output system 240 is used to couple control unit 200 to other systems, subsystems and/or components of the UAV. The other systems, subsystems, and/or components include at least propulsion system 250 and sensors 260. Propulsion system 250 includes motors used to rotate corresponding propellers, such as propellers 130, used to control altitude, orientation, direction, and velocity of the UAV. Each of the motors may be controlled using a suitable feedback control system such as a proportional-integral-derivative (PID) controller, servo controller, and/or the like. Sensors 260 include one or more sensors for monitoring operation of the UAV and/or collecting data. In some examples, sensors 260 may include one or more tachometers for reporting propeller speed, altimeters, positioning systems (e.g., a GPS positioning system), inertial management units, magnetometers, gyroscopes, accelerometers, air bubble sensors, attitude sensors, air speed sensors, temperature sensors, and/or the like including suitable biasing, signal conditioning, and/or related circuitry. In some examples, sensors 260 may further include one or more cameras (still and/or video) for capturing images and/or video from the vantage point of the UAV that, for example, may be used, for example, to send images and/or video as well as other telemetry data to the operator to support non-line-of-sight operation of the UAV.

The other systems, subsystems, and/or components of the UAV further include at least an antenna control system 270 used to actively control antenna system 290. Antenna control system 270 includes one or more servo motors or other actuators and corresponding feedback controllers (e.g., PID controllers, servo controllers, and/or the like) for actively controlling antenna system 290. In some examples, control module 230 and/or antenna control system 270 may use inputs from one or more of the altimeters, positioning systems, inertial management units, magnetometers, gyroscopes, accelerometers, air bubble sensors, attitude sensors, air speed sensors, and/or the like to monitor antenna system 290 and/or to make control decisions regarding antenna system 290.

Signal processing circuitry 280 includes one or more circuits for processing signals, such as RF signals, received by antenna system 290 and signals to be transmitted by antenna system 290. In some examples, signal processing circuitry 280 may include one or more amplifiers, filters, coder-decoders (CODECs), schedulers, signal conditioners, radio frequency (RF) switches, and/or the like. In some examples, one or more of the capabilities of signal processing circuitry 280 may be implemented using one or more suitably programmed DSPs. In some examples, signal processing circuitry 280 may be used to communicate using one or more cellular data standards including 1X, 3G, 4G, 4G LTE, 5G, and/or the like. In some examples, antenna control system 270 may further operate one or more of the RF switches in signal processing circuitry 280 as is described in further detail below.

Antenna system 290 is used to communicate with one or more antenna towers to receive commands from an operator and to send telemetry, photo, video, and/or the like to the operator. In some examples, antenna system 290 may be consistent with antenna system 150. In some examples, antenna system 290 may include one or more multiband antennas allowing antenna system 290 and UAV 100 to communicate with antennas for various network types. In some examples, antenna system 290 may include one or more multi-in multi-out (MIMO) antennas supporting at least two highly decorrelated antenna elements per communication band allowing for flexible use of antenna system 290 with each of the various network types it supports.

According to some embodiments, the design of antenna systems 150 and/or 290 presents challenges. Typical cellular antennas for smart phones, tablets, etc. are omnidirectional. This allows for good signal coverage no matter the orientation of the antenna relative to the nearby antenna towers. In addition, these antennas are often implemented with signal strengths designed to address the challenges of higher and often highly variable attenuation of signals near the ground due to Fresnel zone factors as well as ground clutter due to interference from objects such as buildings, trees, hills, automobiles, trucks, and/or the like.

In contrast, UAVs are typically designed to be operated in open spaces where there is reduced ground clutter or at an altitude where they are above ground clutter. In these more open areas, the UAV is often within direct line-of-sight or near direct-line of sight with multiple antenna towers. In addition, the attenuation of the signals is often much lower than for ground-based cellular devices and attenuates by the much lower factor of $(4\pi df/c)^2$. As a consequence, the antenna system on the UAV is often able to achieve strong reception from a larger number of antenna towers than ground-based cellular devices. This may significantly interfere with the ability of the UAV to reliably receive commands from the operator as the antenna system on the UAV may be subject to much more interference from the larger number of nearby antenna towers, from which the UAV is receiving signals. As a result, this may significantly degrade the ability of the operator to safely control the UAV, especially when the UAV is being operated without direct line-of-sight by the operator. In addition, when the antenna system on the UAV is used to transmit large amounts of telemetry, image, video, and/or other data, such as 4K UL video, the transmission may be detectable by a larger than normal number of antenna towers, including antenna towers that may be some distance from the antenna tower acting as the serving node for the UAV. This transmission then, in effect, interferes with the communication capabilities of these other antenna towers so that it ultimately raises the noise floor for the other antenna towers. The result is degraded service for all the other devices communicating with these other antenna towers.

Accordingly, antenna systems for use in UAVs, such as those described herein, used to communicate with cellular networks may preferably avoid designs with indiscriminate omnidirectional radiation patterns, but are instead designed based on the different transmitter-receiver geometries, expected lines-of-sight, attenuations to be expected with UAV operation, a number of antenna towers within communication range of the UAV, a density of antenna towers near the UAV, and/or the like.

Figure 3A:
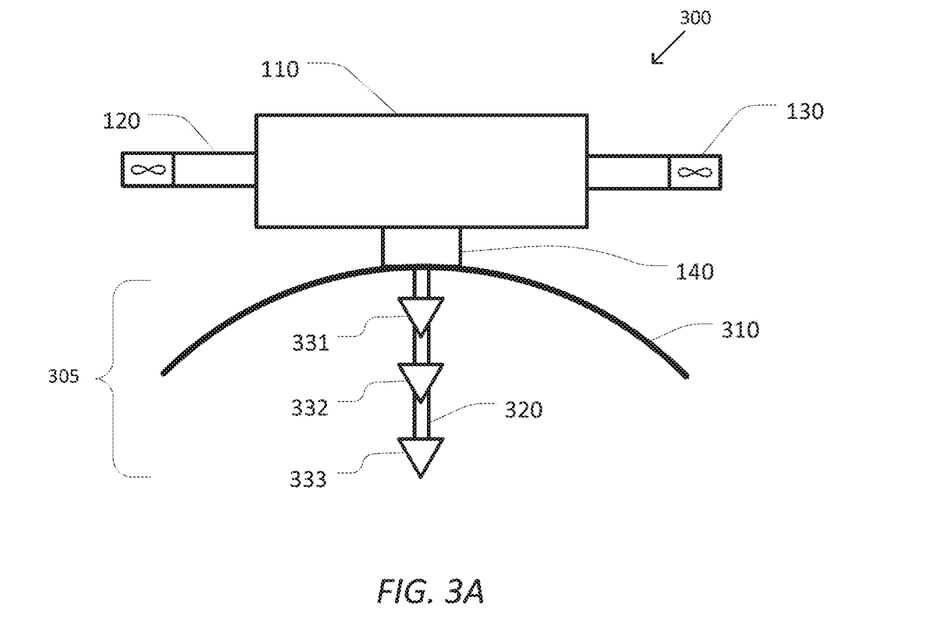
FIGS. 3A and 3B are simplified diagrams of unmanned aerial vehicles and their antenna systems according to some embodiments.

FIG. 3A is a simplified diagram of an unmanned aerial vehicle 300 having an antenna system 305 with a plurality of antennas 331-333 according to some embodiments. As shown in FIG. 3A, UAV 300 includes a central body 110. Attached to body 110 is a plurality of struts 120 coupling body 110 to a plurality of propellers 130. Antenna system 305 is coupled to UAV 300 using an antenna mount 140. According to some embodiments, body 110, strut 120, propellers 130, and/or antenna mount 140 may be consistent with the similarly numbered elements of UAV 100 of FIGS. 1A and 1B. According to some embodiments, antenna system 305 is consistent with antenna system 150 and/or antenna system 290.

Antenna system 305 includes a reflector 310, an antenna mounting spar 320, and the plurality of antennas 331-333. And although antenna system 305 is depicted with three antennas 331-333, antenna system 305 may alternatively include two antennas and/or four or more antennas. Each of the plurality of antennas 331-333 are mounted on antenna mounting spar 320 at a different distance from UAV 300 and antenna mount 140 and more particularly at a different distance from reflector 310. Reflector 310 has a downward facing orientation. As shown, reflector 210 has a parabolic and/or circular shape, but other shapes are possible which are consistent with the embodiments as described herein. In some examples, reflector 310 includes a material (e.g., a metal) that reflects incoming RF signals toward the plurality of antennas 331-333 and reflects outgoing signals downward. In some examples, reflector 310 includes a radio-opaque material that blocks the transmission of signals through reflector 310. In some examples, reflector 310 is able to reflect and/or block RF signals in the frequency bands used by antenna system 305.

Reflector 310 is used to control the signals emitted by the plurality of antennas 331-333 and signals received from nearby antenna towers. Thus, depending on which of the plurality of antennas 331-333 is being used by UAV 300, the angular size of the radiation pattern emitted by antenna system 305 (or alternatively received by antenna system 305) may be controlled. This can be used to control how many antenna towers are able to communicate with UAV 300 using antenna system 305 and/or helps reduce a signal strength between antenna system 305 and more distant antenna towers. As shown, antenna 331 has a narrowest radiation pattern because it is closest to reflector 310, antenna 333 has a broadest radiation pattern because it is farthest from reflector 310, and antenna 332 has a radiation pattern somewhere between the radiation patterns of antennas 331 and 333. In some examples, antenna 333 may be sufficiently below reflector 310 so that is it able to emit and/or receive signals from horizon to horizon. In some examples, one or more RF switches, such as the one or more RF switches of signal processing circuitry 280, may be used to control which of antennas 331-333 is currently in active use by antenna system 305.

Figure 3B:
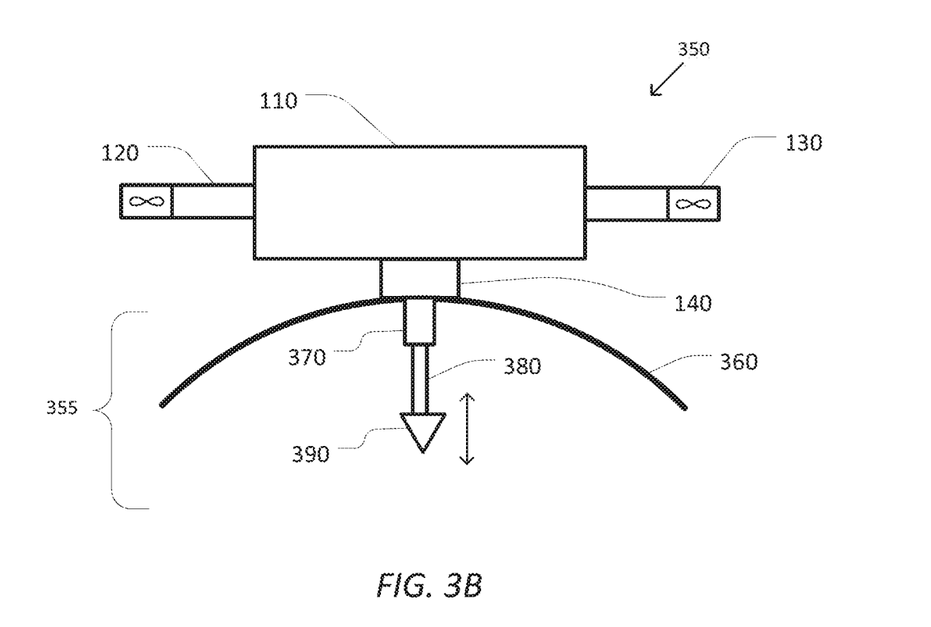

FIG. 3B is a simplified diagram of an unmanned aerial vehicle 350 having an antenna system 355 with a movable antenna 390 according to some embodiments. As shown in FIG. 3B, UAV 350 includes a central body 110. Attached to body 110 is a plurality of struts 120 coupling body 110 to a plurality of propellers 135. Antenna system 355 is coupled to UAV 350 using an antenna mount 140. According to some embodiments, body 110, strut 120, propellers 135, and/or antenna mount 140 may be consistent with the similarly numbered elements of UAV 100 of FIGS. 1A and 1B and/or UAV 300 of FIG. 3A. According to some embodiments, antenna system 355 is consistent with antenna system 150 and/or antenna system 290.

Antenna system 355 includes a reflector 360, an actuator 370, an antenna mounting spar 380, and antenna 390. Antenna 390 is mounted on antenna mounting spar 320, and a distance between reflector 360 and antenna 390 is controlled by actuator 370. Reflector 360 serves a similar purpose as reflector 310 of FIG. 3A and may be substantially similar to reflector 310.

Similar to antenna system 305, antenna system 355 utilizes the same principles (e.g., the distance between the active antenna and the reflector) to control the angular width of the radiation pattern used by antenna system 355. However, instead of switching between differently positioned antennas (e.g., antennas 331-333 of antenna system 305), antenna system 355 physically adjusts the distance between antenna 390 and reflector 360 using actuator 370. In some examples, actuator 370 may be a hydraulic actuator, a pneumatic actuator, a linear actuator, a screw drive, and/or the like. In some examples, actuator 370 may include one or more motors, servos, stepper motors, solenoids, and/or the like for controlling the actuation and thus the distance between antenna 390 and reflector 360.

As discussed above and further emphasized here, FIGS. 3A and 3B are merely examples which should not unduly limit the scope of the claims. One of ordinary skill in the art would recognize many variations, alternatives, and modifications. In some embodiments, an antenna system which is a hybrid of antenna systems 305 and 355 may be used. The hybrid antenna system includes a plurality of antennas positioned at different distances from a reflector like antenna system 305. Additionally, the hybrid antenna system includes one or more actuators for further adjusting the distance between the plurality of antennas and the reflector using an approach similar to antenna system 355. In some examples, coarse control of the active antenna position may be controlled by switching between the plurality of antennas and fine control of the active antenna position may be controlled using the one or more actuators.

Selection of which of antennas 331-333 is used by antenna system 305 and/or the position of antenna 390 relative to reflector 360 may depend on one or more factors. In some embodiments, the selection of antenna and/or the position of the antenna may be selected to strike an appropriate balance between being able to establish reliable communication with the antenna tower acting as the serving node for the UAV and reducing interference and/or noise floor problems associated with other nearby antenna towers. In some examples, the one or more factors may include one or more of a height of the UAV, a number of nearby antenna towers for which signals can be exchanged, a density of the nearby antenna towers, and/or the like. In some examples, where the antenna tower density is high (e.g., an average distance between nearby antenna towers is low), an antenna position closer to the reflector is preferred so as to reduce the number of antenna towers in communication with the antenna. In some examples, where the antenna tower density is low (e.g., an average distance between nearby antenna towers is high), an antenna position farther from the reflector is preferred so as to increase the likelihood that the nearest antenna tower is able to establish communication with the antenna.

Figure 4:
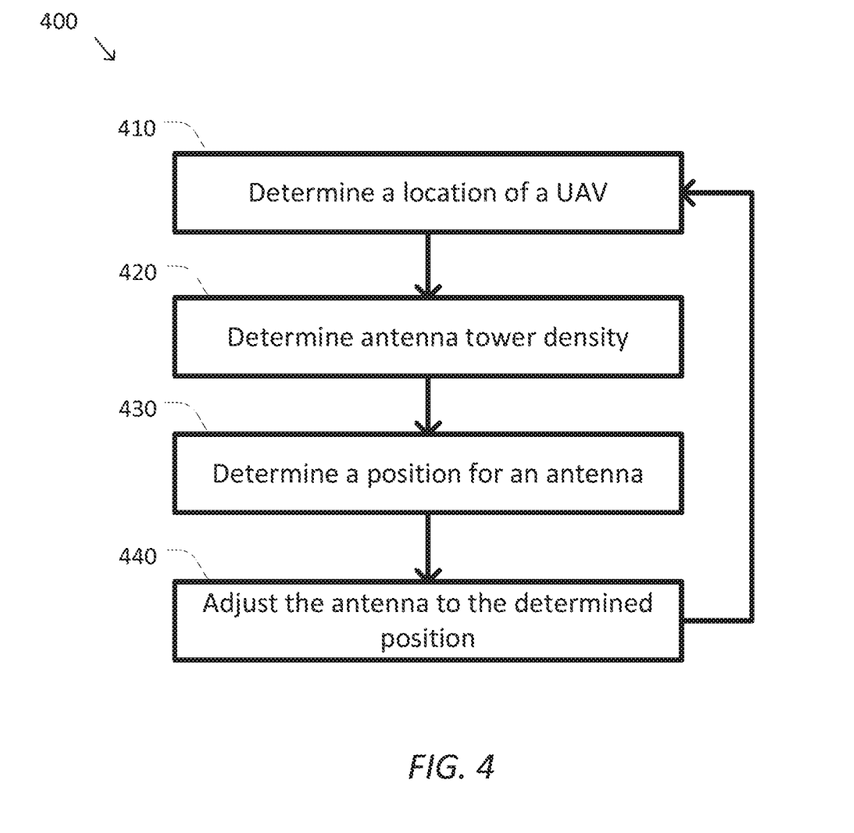
FIG. 4 is a simplified diagram of method of operating an antenna system according to some embodiments.

FIG. 4 is a simplified diagram of a method 400 of operating an antenna system according to some embodiments. One or more of the processes 410-440 of method 400 may be implemented, at least in part, in the form of executable code stored on non-transitory, tangible, machine-readable media that when run by one or more processors (e.g., the processor 210) may cause the one or more processors to perform one or more of the processes 410-440. In some embodiments, method 400 may be performed by a module of a UAV, such as control module 230 and/or antenna control system 270. In some embodiments, method 400 may be used to control an antenna system, such as any of the antenna systems 150, 290, 305, and/or 355.

At a process 410, a location of the UAV is determined. In some examples, the location of the UAV may be determined using a positioning system (e.g., a GPS) that may be able to determine one or more of a latitude, a longitude, and/or a height of the UAV. In some examples, the location of the UAV may be determined based on an identifier of the serving node for the UAV. In some examples, the location of the UAV may be determined based on position triangulation using time alignment, timing advance, and/or other similar information included in the signals received from the serving node and/or other nodes on other antenna towers in the vicinity of the UAV. In some examples, the height of the UAV may also be determined using an altimeter, a ranging system measuring distance above the ground, and/or the like.

At a process 420, antenna tower density in the vicinity of the UAV is determined. In some embodiments, antenna tower density may be characterized as a density (e.g., number of antenna towers per square kilometer and/or the like), as an average distance between antenna towers (e.g., an average distance in meters), a number of nearby antenna towers for which the UAV is able to receive signals, and/or the like. In some examples, the position of the UAV determined during process 410 may be used to query a database of antenna tower density. In some examples, the database may be stored in the UAV, accessible via a query through the serving node for the UAV, and/or the like. In some examples, the database may also provide information on the typical and/or average height of each of the nearby antenna towers. In some examples, the number of nearby antenna towers for which the UAV is able to receive signals may be determined by counting a number of antenna towers whose reference signals received quality (RSRQ), reference signals reference power (RSRP), signal to interference plus noise ratio (SINR), and/or the like is above a desirable threshold. In some examples, the RSRQ, RSRP, SINR, and/or similar observations may be determined for each of multiple antennas (e.g., antennas 331-333), different antenna positions (e.g., different positions of antenna 390 relative to reflector 360), and/or the like. In some examples, the observations for each of antennas, antenna positions, and/or the like may be considered separately and/or in aggregation.

At a process 430, a position for the antenna is determined. In some examples, the position of the antenna is determined relative to the reflector (e.g., is the antenna to be positioned closer to the reflector and/or farther away from the reflector). In some examples, the position for the antenna may be determined based on the antenna tower density determined during process 420, the height determined during process 410, and/or a combination of both. In some examples, the antenna position may be determined by considering the geometry between one or more of the antenna, the reflector, the height of the UAV, the height of nearby antenna towers, and the density of the antenna towers.

Figure 5:
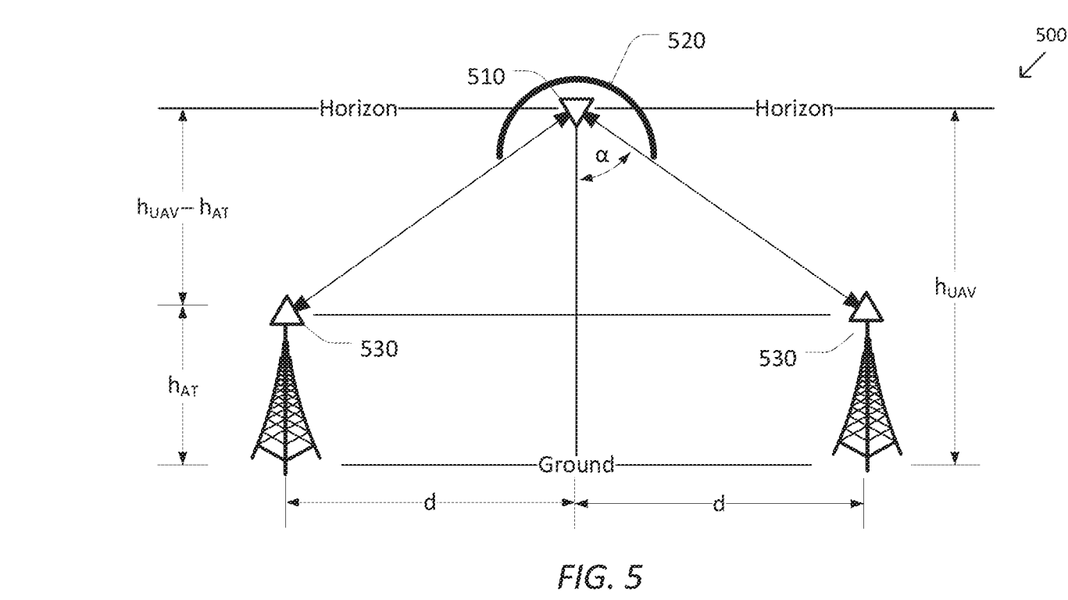
FIG. 5 is a simplified diagram of an unmanned aerial vehicle and antenna tower geometry according to some embodiments.

FIG. 5 is a simplified diagram of an unmanned aerial vehicle and antenna tower geometry 500 according to some embodiments. As shown in FIG. 5, UAV antenna 510 is located at a height of $h_{UAV}$ above the ground. Reflector 520 limits the angular width of signals received by and receivable from UAV antenna 510 (e.g., because of the position of UAV antenna 510 relative to reflector 520) to an angle from vertical of $\alpha$. If the antennas of nearby antenna towers 530 are at an approximate height of $h_{AT}$ above the ground, then UAV antenna 510 has to be within a horizontal distance d of an antenna tower 530 in order to exchange radio signals with antenna tower 530. The distance d may be determined according to Equation 1.

$$d = (h_{UAV} - h_{AT}) \tan(\alpha) \qquad \text{Equation 1}$$

Controlling the position of UAV antenna 510 relative to reflector 520 allows angle $\alpha$ to be increased or decreased causing a corresponding increase or decrease in distance d. Thus, by selecting distance d based on the average distance between antenna towers, it is possible to reasonably control a number of antenna towers 530 that can exchange signals with UAV antenna 510. In some examples, a value for the angle $\alpha$ may be determined so as to obtain a distance d as a multiple of the average distance between antenna towers according to Equation 2, where $d_{AT}$ is the average distance between antenna towers and $\beta$ is a multiple, such as 1.5, 2, 3, and/or higher.

$$\alpha = f(d_{AT}) = \tan^{-1}\left(\frac{\beta d_{AT}}{h_{UAV} - h_{AT}}\right) \qquad \text{Equation 2}$$

Referring back to FIG. 4 and process 430, in some embodiments, the antenna position may alternatively be determined to control the number of antenna towers that the antenna can detect with a RSRQ, RSRP, SINR, and/or the like above a desired threshold.

According to some embodiments, process 430 may use any number of ways to determine the position for the antenna; including using one or more of a formula, a look-up table, heuristic rules, and/or the like. In some embodiments, process 430 may use a combination of approaches (e.g., the geometry of FIG. 5, the number of antenna towers, etc.) to determine the position for the antenna. In some examples, each of the approaches may be used to separately recommend a position for antenna, with each of the recommendations being combined to make a final determination of the position for the antenna.

At a process 440, the antenna is adjusted to the position determined during process 430. In the examples of FIG. 3A, the antenna may be adjusted by switching (e.g., using one or more RF switches) to the antenna 331-333 which is closest to the determined position or which is closest to the determined position without being closer to reflector 310 than the determined position. In the examples of FIG. 3B, antenna 390 may be adjusted to the determined position using actuator 370. In the examples where both switching and actuation are used, the antenna may be switched to the antenna whose positional range includes the determined position and then actuated to the determined position using a corresponding actuator.

As discussed above and further emphasized here, FIG. 4 is merely an example which should not unduly limit the scope of the claims. One of ordinary skill in the art would recognize many variations, alternatives, and modifications. In some embodiments, additional approaches for adjusting the antenna and/or antenna system to achieve reliable communication with the serving node while reducing interference, etc. with other nearby antenna towers are possible as an alternative to and/or a supplement to process 440. In some examples, one or more of gain modulation, phase modulation, beam forming, radiation pattern modulation, selection from among antennas with different radiation patterns, antenna aiming (e.g., adjusting an angle of the antenna relative to vertical), and/or the like may be used to further adjust the antenna and/or antenna system.

Some examples of UAVs 100, 300, and/or 350 may include non-transitory, tangible, machine readable media that include executable code that when run by one or more processors (e.g., processor 210) may cause the one or more processors to perform the processes of method 400. Some common forms of machine readable media that may include the executable code for performing the processes of method 400 are, for example, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. An antenna system for an unmanned aerial vehicle (UAV), the antenna system comprising:
a reflector comprising at least one of a material that reflects Radio Frequency (RF) signals or a material that blocks transmission of RF signals through the reflector;

one or more antennas mechanically coupled to the reflector; and a control system communicatively coupled to the one or more antennas;

wherein the control system is configured to:
   determine a density of antenna towers near the antenna system;
   determine a position for an active antenna of the one or more antennas relative to the reflector based on the density and an angular width of at least one of RF signals received by or receivable from the active antenna at the position relative to the reflector; and
   adjust the active antenna to the determined position relative to the reflector.

2. The antenna system of claim 1, wherein the control system is further configured to:
   determine a location of the antenna system; and
   determine the density based on the location.

3. The antenna system of claim 1, wherein the control system is further configured to:
   determine a height of the antenna system; and
   determine the position further based on the height.

4. The antenna system of claim 1, wherein the density is an average number of antenna towers per unit area of the antenna towers, an average distance between the antenna towers, or a number of the antenna towers that can communicate with the antenna system.

5. The antenna system of claim 4, wherein to determine the number of the antenna towers that can communicate with the antenna system the control system is configured to determine the number of the antenna towers that have a reference signals received quality (RSRQ), reference signals reference power (RSRP), or signal to interference plus noise ratio (SINR) above a threshold.

6. The antenna system of claim 4, wherein the number of the antenna towers that can communicate with the antenna system is determined for each of the one or more antennas.

7. The antenna system of claim 1, further comprising:
   one or more switches;
   wherein:
      each of the one or more antennas is a different distance from the reflector; and
      to adjust the active antenna to the determined position the control system is configured to use the one or more switches to select one of the one or more antennas closest to the determined position as the active antenna.

8. The antenna system of claim 1, further comprising:
   an actuator;
   wherein:
      to adjust the active antenna to the determined position the control system is configured to use the actuator to move the active antenna to the determined position.

9. A method of controlling an antenna system for an unmanned aerial vehicle (UAV), the method comprising:
   determining, by a control system of the antenna system, a density of antenna towers near the UAV;
   determining, by the control system, a position for an active antenna of one or more antennas of the antenna system relative to a reflector of the antenna system based on the density and an angular width of at least one of RF signals received by or receivable from the active antenna at the position relative to the reflector; and
   adjusting, by the control system, the active antenna to the determined position relative to the reflector.

10. The method of claim 9, further comprising:
    determining a location of the UAV; and
    determining the density based on the location.

11. The method of claim 9, further comprising:
    determining a height of the UAV; and
    determining the position further based on the height.

12. The method of claim 9, wherein the density is an average number of antenna towers per unit area of the antenna towers, an average distance between the antenna towers, or a number of the antenna towers that can communicate with the antenna system.

13. The method of claim 9, wherein:
    each of the one or more antennas is a different distance from the reflector; and
    adjusting the active antenna to the determined position comprises using one or more switches to select one of the one or more antennas closest to the determined position as the active antenna.

14. The method of claim 9, wherein adjusting the active antenna to the determined position comprises using an actuator to move the active antenna to the determined position.

15. An unmanned aerial vehicle (UAV), the UAV comprising:
    a body;
    an antenna system mounted to the body for receiving commands for the UAV via a network and for transmitting data from the UAV via the network, the antenna system having a reflector coupled to one or more antennas; and
    a control system;
    wherein the control system is configured to:
       determine a density of antenna towers near the UAV;
       determine a position for an active antenna of the one or more antennas relative to the reflector based on the density and an angular width of at least one of RF signals received by or receivable from the active antenna at the position relative to the reflector; and
       adjust the active antenna to the determined position relative to the reflector.

16. The UAV of claim 15, wherein the control system is further configured to:
    determine a location of the UAV; and
    determine the density based on the location.

17. The UAV of claim 15, wherein the control system is further configured to:
    determine a height of the UAV; and
    determine the position further based on the height.

18. The UAV of claim 15, wherein the density is an average number of antenna towers per unit area of the antenna towers, an average distance between the antenna towers, or a number of the antenna towers that can communicate with the antenna system.

19. The UAV of claim 15, wherein:
    the antenna system further comprises one or more switches;
    each of the one or more antennas is a different distance from the reflector; and
    to adjust the active antenna to the determined position the control system is configured to use the one or more switches to select one of the one or more antennas closest to the determined position as the active antenna.

20. The UAV of claim 15, wherein:
    the antenna system further comprises an actuator; and
    to adjust the active antenna to the determined position the control system is configured to use the actuator to move the active antenna to the determined position.

* * * * *